Feb. 15, 1955  C. T. E. MORRISON  2,702,183
CAR REFRIGERATION AND HEATING SYSTEM
Filed May 11, 1951  14 Sheets-Sheet 2

Fig. 2.

INVENTOR
Charles T. F. Morrison
BY
ATTORNEYS

Feb. 15, 1955　　C. T. E. MORRISON　　2,702,183

CAR REFRIGERATION AND HEATING SYSTEM

Filed May 11, 1951　　14 Sheets-Sheet 4

INVENTOR
Charles T. F. Morrison
BY
ATTORNEYS

United States Patent Office 2,702,183
Patented Feb. 15, 1955

2,702,183

CAR REFRIGERATION AND HEATING SYSTEM

Charles T. F. Morrison, Washington, D. C., assignor to Coldcargo Corporation, Washington, D. C., a corporation of Delaware Application May 11, 1951, Serial No. 225,866

20 Claims. (Cl. 257—3)

This invention is a novel automatically controlled circulating air refrigeration system, which is diesel-electric operated, same consisting of a dual system, two complete refrigeration units being integrated into one, although each unit may work independently of the other, as it does during a stipulated defrosting cycle. However, under normal conditions, both units will work concurrently.

The primary object of my invention is to provide a refrigeration system wherein a substantial volume of air per minute is drawn from the cargo area of a railway car, trailer body or the like, over evaporator coils, and then returned to said cargo area, the air being drawn into ducts in the top portion of the cargo area, and after passing through the evaporation coils, being redistributed through ducts in the lower portion of the cargo area under the usual cargo racks provided in such area, apertures in the lower and top ducts being so controlled as to size or area that same will distribute an even temperature throughout the cargo area, and the apertures being automatically openable and closable at predetermined cycles, the cargo itself acting as additional baffles for the distribution or circulation of air.

Another object of my invention is to provide means designed to maintain temperatures of, say, 10 to 15 degrees below zero F. in an insulated area of cargo space which may contain, say, 1600 to 2000 cubic feet, the above being based on an outside air temperature of 95 degrees, and a sun surface temperature of 130 degrees; and the cycling period being based on 16 out of 24 hours per diem.

Another object of my invention is to provide a refrigeration system of the above type, in which each unit has an automatic defroster which is set at 12-hour staggered intervals or other desired time cycles and in which the defrost cycling time is only 6 to 20 minutes, each unit having a defrost residue sump pump with petcock drain, either to save for further use or dispose of the condensed moisture, as desired.

A further object of my invention is to provide a refrigeration system of the above type in which the entire system, as well as its component parts, is fitted with anti-vibration and shock shims, so that the amplitude of vibrations and force of shock is reduced to a minimum.

A further object of my invention is to provide a refrigeration system of the above type in which the diesel-electric power plant has automatic start-stop controls, and all component parts of the system have automatic controls.

A further object of my invention is to provide a refrigeration system of the above type wherein all cycling times may be set on an automatic panel board, and are activated by suitable thermostats; also a system in which the unit is equipped with a by-pass and stand-by inlet, so that stationary electric power may be used, such as when the railway car or trailer is at a fixed station or under repair.

A still further object of my invention is to provide a refrigeration system of the above type having a three-color target, visible from outside the car or trailer, the same being provided to show the status of operation of the refrigeration system within the cargo area.

A still further object of my invention is to provide a system so designed that it may be converted easily into a general service car with refrigeration, heating, and humidity control, with all the component parts automatically controlled.

I will explain the invention with reference to the accompanying drawings, which illustrate one practical embodiment thereof to enable others familiar with the art to adopt and use the same; and will summarize in the claims the novel features of construction, and novel combinations of parts for which protection is desired.

As shown, my novel system is adapted to be housed within a railway car, trailer, or the like of standard form and shape, the same having longitudinal side walls S (Fig. 1), a bottom B, end wall E, and a top T, same being of usual construction. For convenience of illustration, the invention is shown in connection with a refrigerated railway car, but obviously could be adapted to any other type of vehicle or cargo-handling space or body.

Within the car adjacent one end thereof is a transverse bulkhead P (Fig. 1) of any desired construction, the same extending from top to bottom, and from side to side of the cargo space, the chamber C between the adjacent end E of the car and the bulkhead P forming a compartment for housing the diesel-electric power units and the other component parts of the system, with the exception of the inlet and outlet ducts, fuel tanks and certain other elements of the system, hereinafter referred to.

Within chamber C is a diesel generator comprising a diesel engine 1, and an electric generator 2 driven thereby mounted upon transverse base bars 3 adjacent the top of compartment C, said engine 1 and generator 2 being disposed at one side of compartment C, which diesel-generator unit 1, 2 supplies the electric current for the entire system.

At the bottom of compartment C, at each side thereof, are the compressors and their motors, indicated generally by the reference numeral 4, for operating each of the two refrigerating units respectively. Directly above the compressors 4, at each side thereof, are their related condensers 5. At each side of the chamber C are also arranged the Thermobanks 6 (such as disclosed in U. S. Letters Patent No. 2,440,146, dated April 20, 1948), one Thermobank being provided for each unit to store the heat for the purpose of defrosting at a predetermined time, said Thermobanks being of well-known commercial type.

At the top of the cargo space, extending longitudinally thereof, are two or more air return ducts 7, two being shown, which are identical in shape and design, the same extending through the bulkhead P and being directed downwardly as at 7a, and converging as at 7b at a point adjacent the inlet of the blower hereinafter described. Within the down-turned portions 7a are arranged the refrigerating coils 8 (Fig. 3) of each unit.

Figure 1:
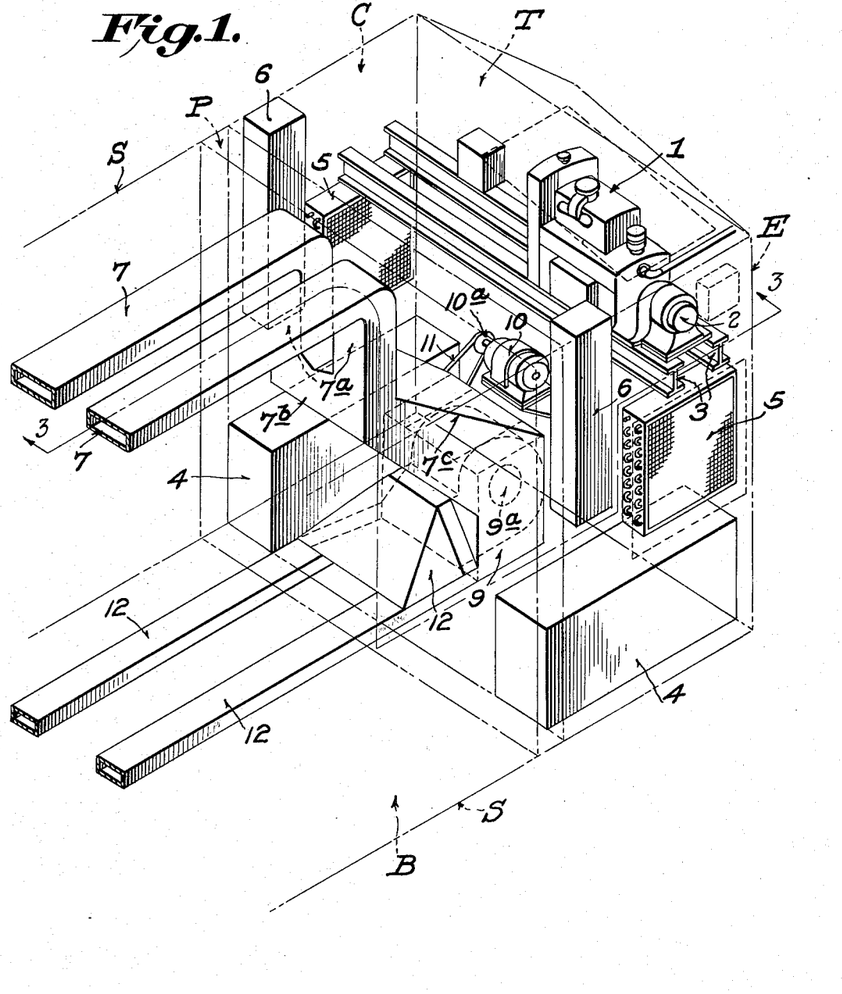
Figure 1 is a partial perspective diagrammatic view of a refrigerated railway car, showing the arrangement of inlet and outlet ducts, the transverse bulkhead at one end of the car behind which is disposed the diesel-electric power plant, also showing the refrigerating coils and ducts, and the major component parts of the system.
Figure 2:
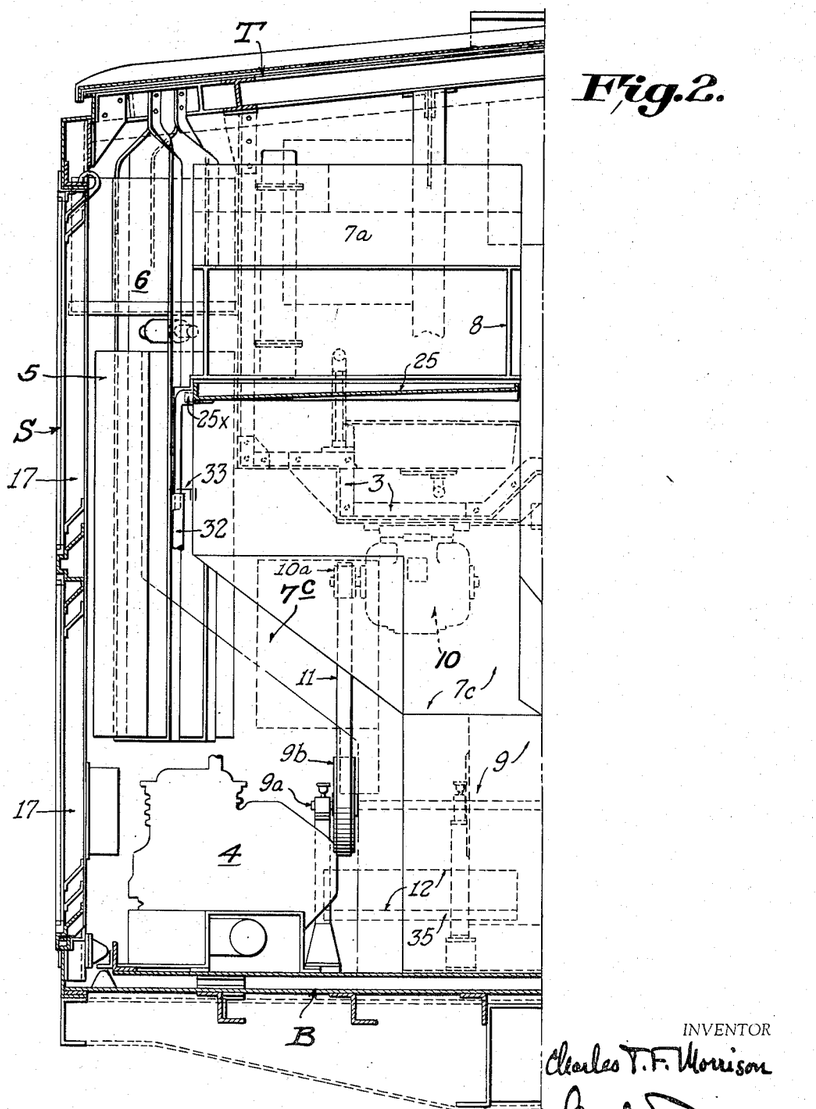
Fig. 2 is an elevation, partly in section, showing the arrangement of parts of the refrigeration system at one side of the power compartment of the car.
Figure 2A:
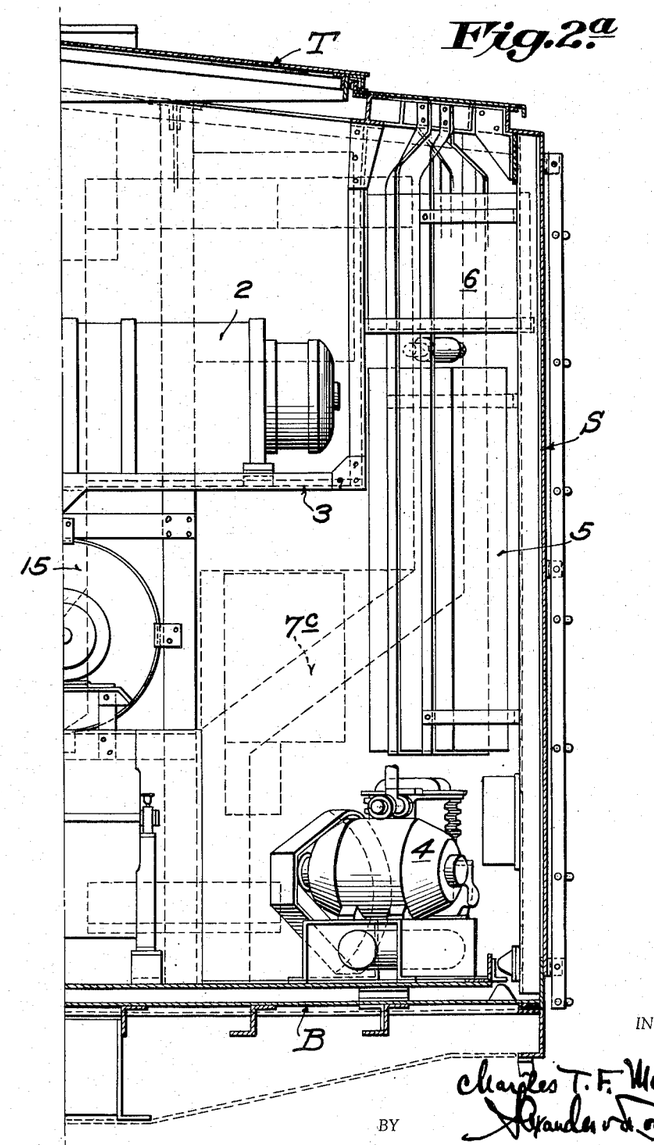
Fig. 2a is a view similar to Fig. 2, but showing the other half of the refrigeration system.
Figure 3:
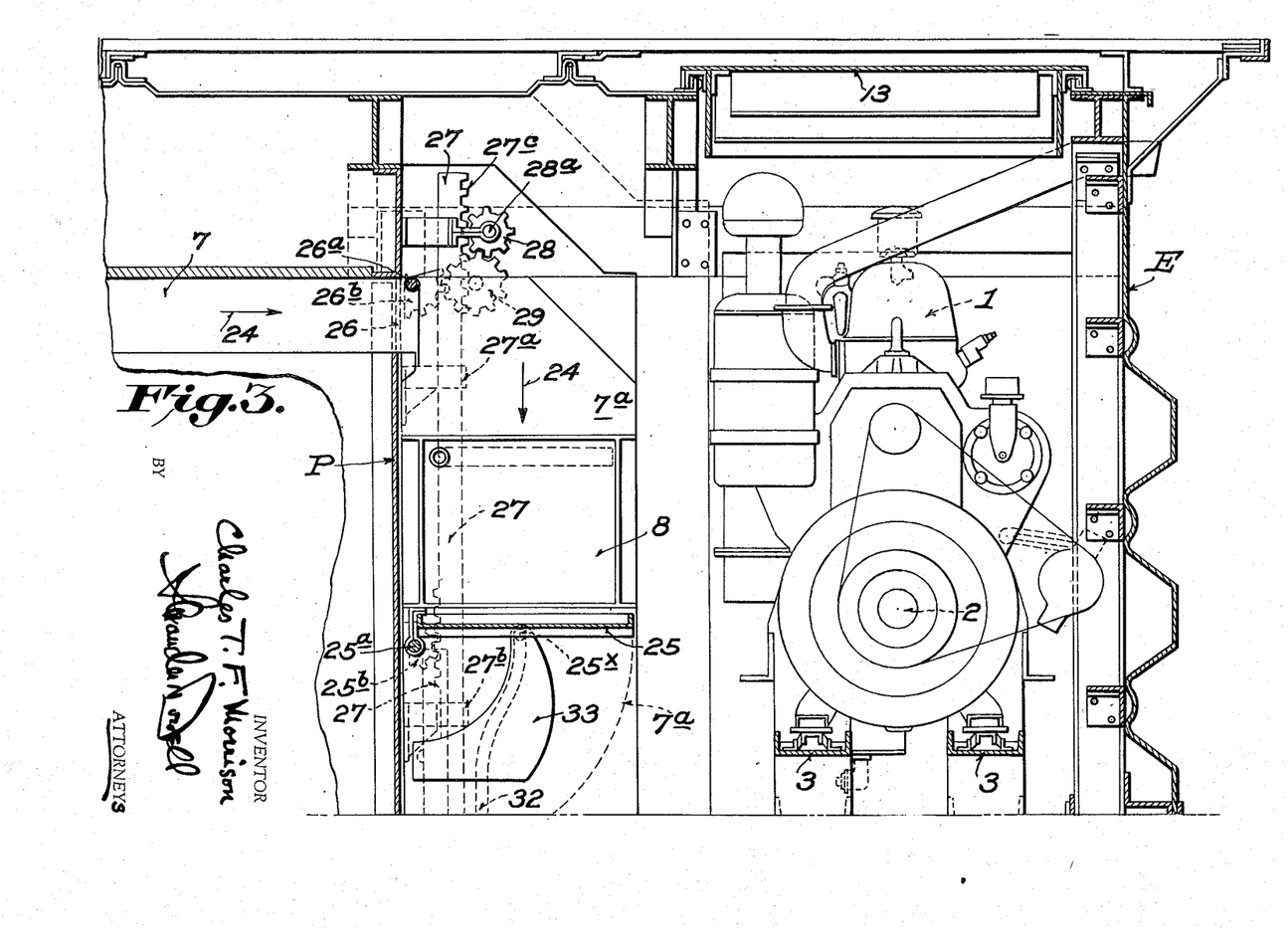
Fig. 3 is a longitudinal section through the diesel-electric power compartment, and the adjacent portions of the car, on the line 3—3 of Fig. 1, showing the arrangement of parts in the upper portion of said power compartment.
Figure 3A:
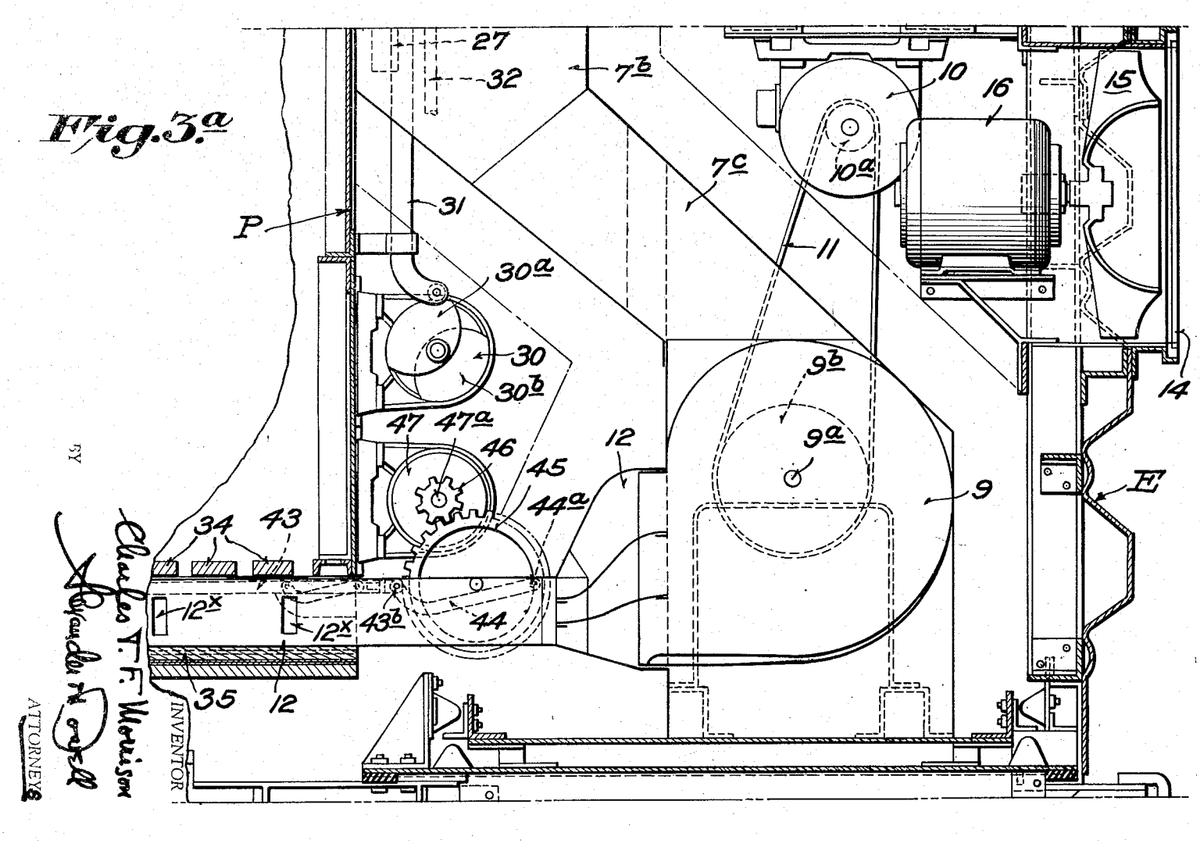
Fig. 3a is a view similar to Fig. 3, but showing the arrangement of parts in the lower portion of the diesel-electric compartment.

The converged portion 7b is deflected downwardly as at 7c (Figs. 1 and 3a) into the inlet or top of the blower housed in casing 9, which blower is of wheel-type having a shaft 9a driven through suitable sprockets and belting 11 from an electric motor 10 driven by the diesel power system, as shown in Figs. 1 and 3a, motor 10 having a belt pulley 10a (Fig. 3a) over which runs belt 11, which belt also runs over pulley 9b on the blower shaft 9a. The outlet from blower 9 communicates directly with two refrigerated air supply ducts 12 (Figs. 1 and 3a), which extend along the bottom of the cargo area adjacent the center thereof, as will be hereinafter more fully described.

Figure 4:
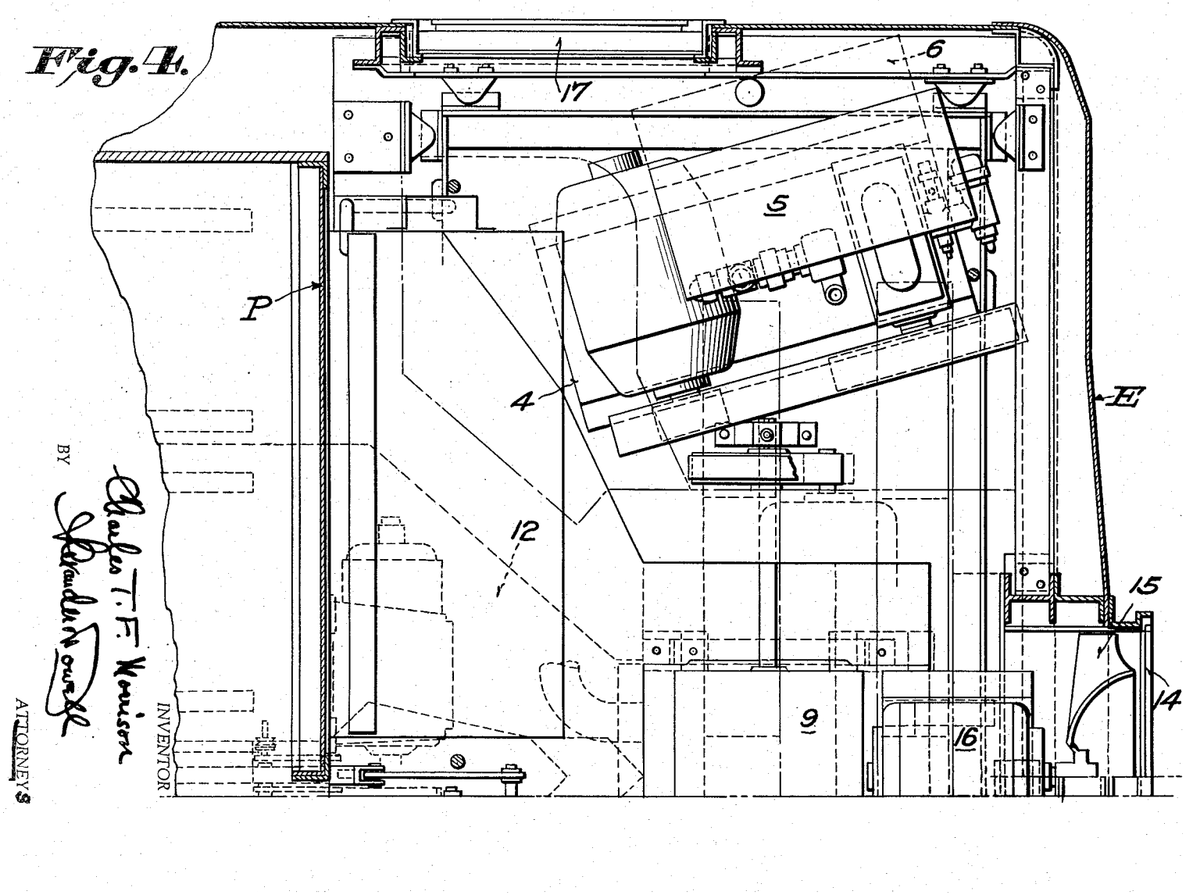
Fig. 4 is a horizontal section through the diesel-electric compartment.
Figure 4A:
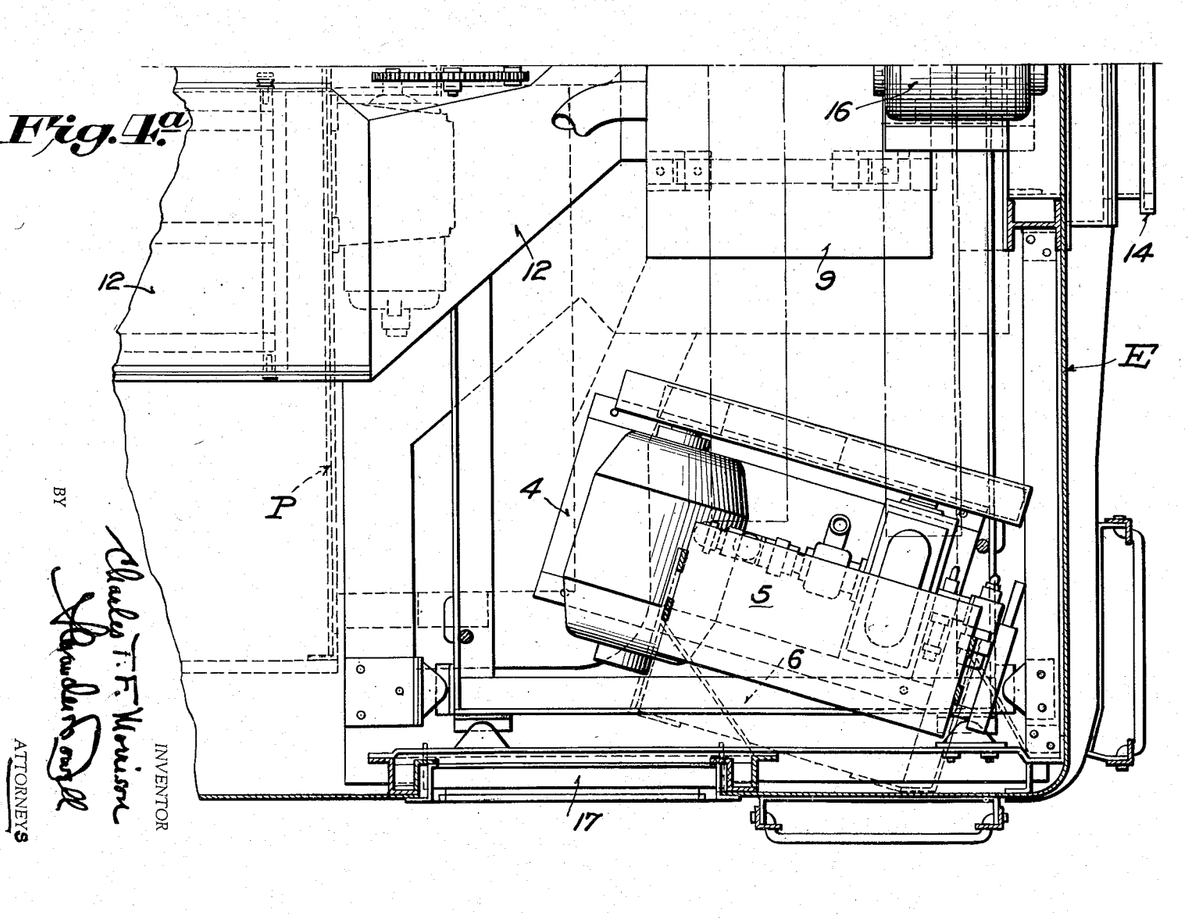
Fig. 4a is a view similar to Fig. 4, but showing the arrangement of parts at the other side of said power compartment.
Figure 5:
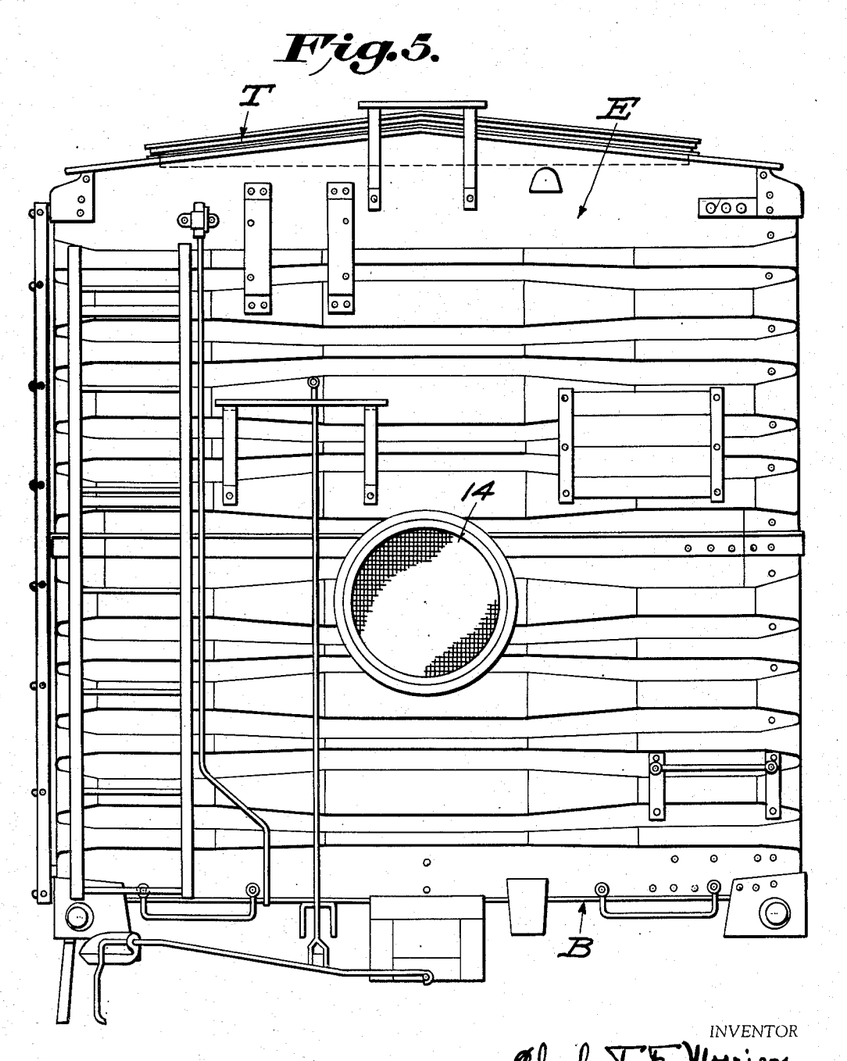
Fig. 5 is an end view of a refrigerated railway car according to my invention, showing the signal lights, and the condenser exhaust fan outlet.
Figure 9:
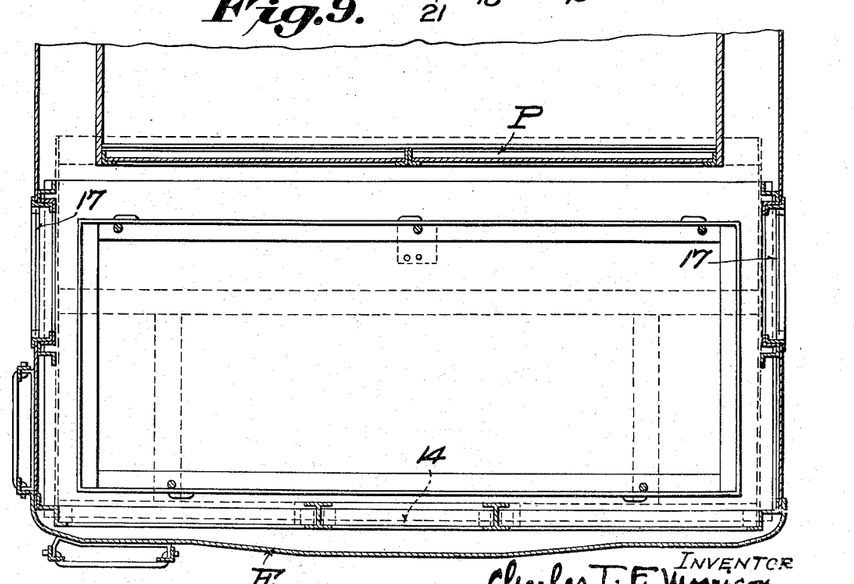
Fig. 9 is a plan view of the floor of the motor and refrigeration area of the car showing its relationship to the cargo area and tanks.

As shown in Fig. 3, in the top of chamber C is an access opening provided with a removable door 13. In the end wall E of the car, as shown in Figs. 3a and 5, is an opening provided with a screen 14, behind which is disposed a relatively large exhaust fan 15, the hub of which is mounted upon the shaft of an electric motor 16 receiving its power from the diesel-electric unit 1, 2, the object of fan 15 being to draw air in from louvers 17 (Figs. 4 and 9) in the side walls S into the chamber C over the condensers 5 and to exhaust same through screen 14 in the end wall E, thereby maintaining circulation of air through the chamber C over the condensers. The louvers 17 in the sides S of the car are shown in Figs. 4, 4a and 9, the same being disposed at both sides of chamber C and permitting ready ingress of air into chamber C at all times, while protecting the parts thereof from rain, in the usual manner.

Figure 6:
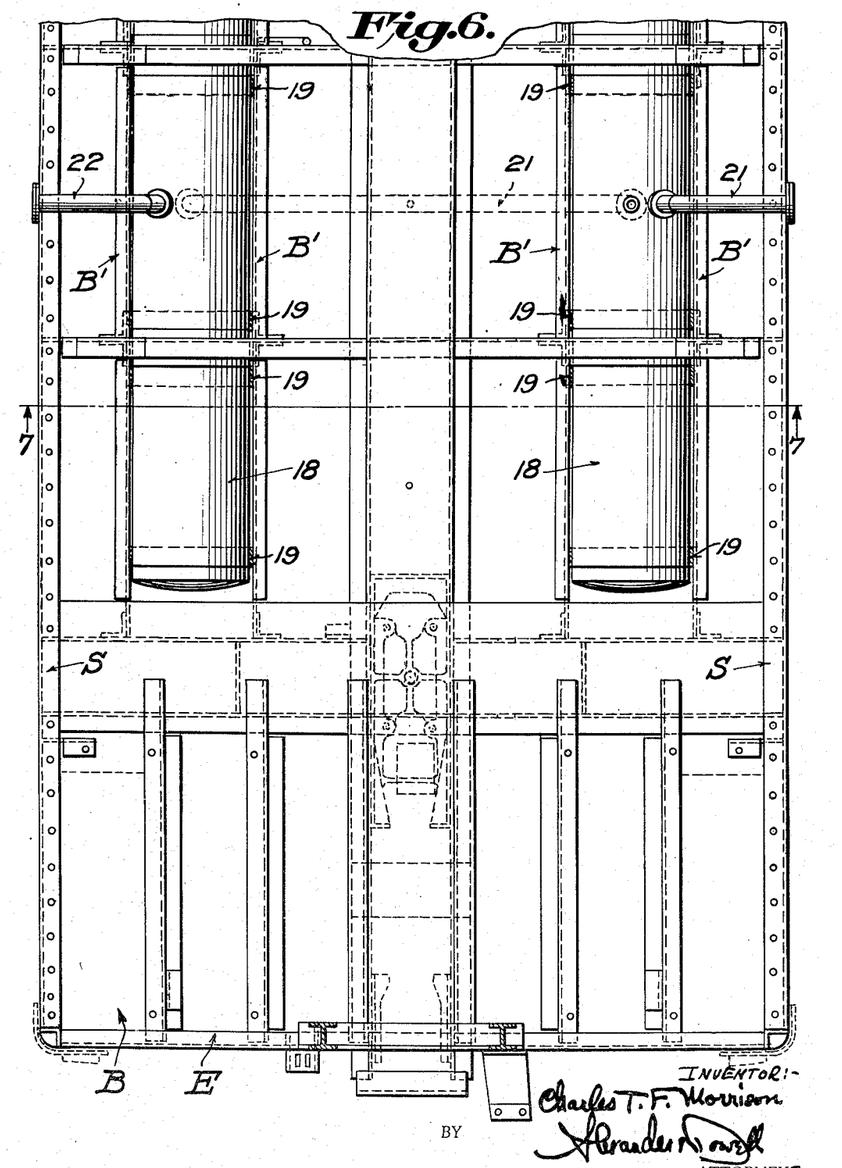
Fig. 6 is a bottom plan view of the bottom of the car, showing the arrangement of the fuel tanks under the sills.
Figure 7:
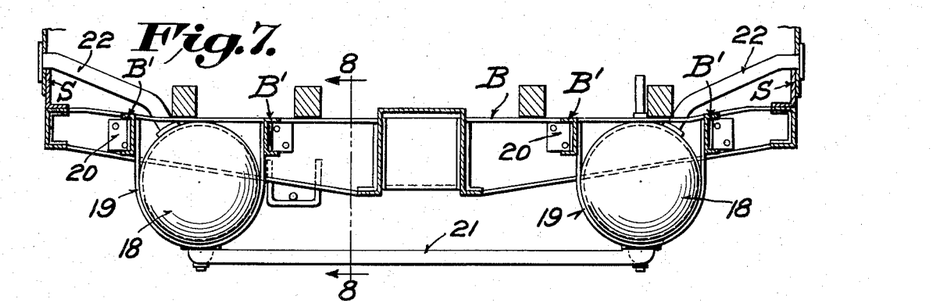
Fig. 7 is a transverse view taken on the line 7—7, Fig. 6.
Figure 8:
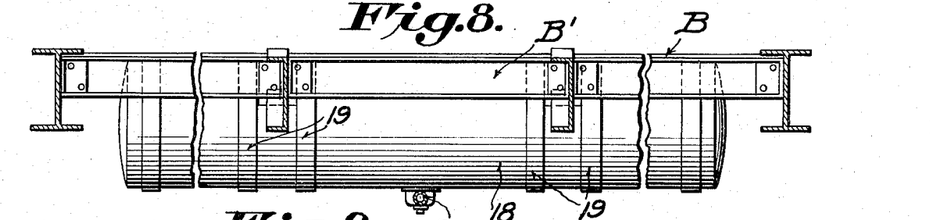
Fig. 8 is a transverse section taken on the line 8—8, Fig. 7.

As shown in Figs. 6, 7 and 8, the fuel tanks for the diesel engine 1 are conveniently disposed below the bottom B of the car between the longitudinal carlins B', the tanks being denoted by the reference numerals 18 and being disposed one adjacent each side of the bottom B with their upper peripheries disposed adjacent the flooring, the same being secured in position by means of straps 19 having their ends secured by cleats 20 or the like so as to be partially housed within the carlins B' the same forming a very convenient way of mounting the fuel tanks 18.

The bottoms of tanks 18 (Fig. 7) are connected by a cross fuel line 21 so as to maintain the same level of fuel in each tank, while the upper portions of tanks 18 have filling connections 22 which extend to the outer face of the side walls S, and are provided with removable caps for the purpose of filling the tanks 18 from either side of the car. Suitable pipe connections (not shown) extend from each tank 18 to the fuel pump (not shown) leading directly to the diesel engine 1, in any desired manner. The above arrangement forms a convenient means for filling the fuel tanks 18 from either side of the car without affecting in any way the feeding of fuel from any of the tanks 18 or all of them to the diesel engine 1.

Figure 10:
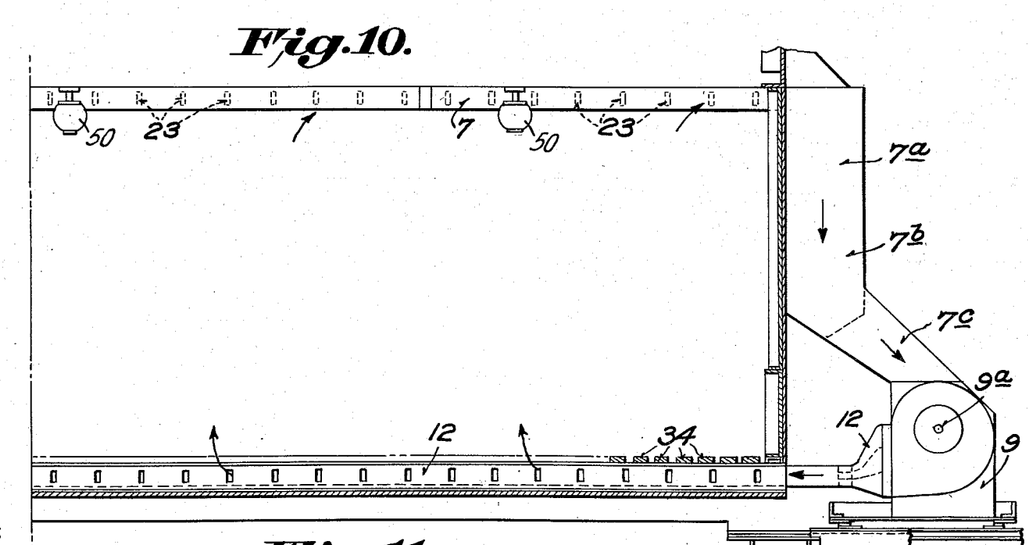
Fig. 10 is an elevation showing the general arrangement of the air circulating ducts and the blower system.

Referring to Figs. 1, 3 and 10, the intake ducts 7 which are disposed adjacent the top of the cargo space, are provided on their inner faces with air intake openings 23 shown more particularly in Fig. 10, whereby the air in the upper portion of the cargo space may be freely drawn into either or both intake ducts 7, the air passing in the direction of the arrow 24 (Fig. 3) down toward the blower 9. It should be now stated that while two air circulation systems including ducts 7 are shown disposed side by side, both are identical, and therefore only one of said systems will be described herein, it being understood that the other system or systems are identical therewith.

The air in ducts 7 is drawn therethrough into ducts 7a in chamber C, and passes downwardly through ducts 7a and through the refrigerator coils 8 (Fig. 3) which are disposed in the ducts 7a, the same passing downwardly towards the blower 9, past dampers 25 (Fig. 3) which as shown in full lines in Fig. 3 are in closed position to shut off the passage of air for defrosting purposes, but which are further shown therein in dotted lines in open position to permit the air to pass down through ducts 7b, 7c into the inlet of blower 9. Means are provided for operating each damper 25.

Operating simultaneously with each damper 25 is a damper 26 (Fig. 3) in the end of the horizontal portion of each intake duct 7, which damper 26 may be similarly opened or closed. As shown, each damper 26 is pivoted on a shaft 26a, while the damper 25 is pivoted on a shaft 25a. Shaft 26a carries a gear segment 26b, while shaft 25a carries a gear segment 25b, the gear segments 26b, 25b being arranged in vertical alignment. Cooperating with the gear segments 26b and 25b is a rack bar 27 (Fig. 3) having teeth constantly meshing with the segments 26b and 25b, said rack bar 27 being vertically slidably mounted in guides 27a, 27b (Fig. 3) mounted on the partition P (as shown in Fig. 3) and having teeth 27c at its upper end engaged by a pinion 28 journaled on a shaft 28a, pinion 28, meshing with a reverse acting gear 29 which is actuated by a gearhead motor 30 (Fig. 3a) through the medium of eccentrics on the shaft of the motor 30 actuating a vertical slidable rod 31, the eccentrics being indicated at 30a, 30b.

By the above constructions, the dampers 26, 25 will be simultaneously open, in one position of the eccentrics 30a, 30b; or will be closed so as to close the ducts 7a to permit defrosting of the coils 8 in their respective ducts 7a. When both dampers 26 and 25 are open, however, the air is free to pass from the ducts 7 into the inlet of the blower 9.

As shown in Fig. 3, the damper 25 has the form of a shallow pan provided with an outlet 25x which is connected by a drain pipe 32 extending through the bottom of the chamber C. A suitable cutout 33 is provided in each duct 7a to allow for movement of the flexible hose 32 and for the swing of the shallow pan, said cutout being provided with a housing thereover. The motor 30 controlling the dampers 26 and 25 will be hereinafter explained, said motor being actuated by the Thermobank 6 (Fig. 1) at each side of chamber C. After passing the open dampers 26 and 25, the air is directed downwardly into the converging portion 7b (Figs. 1 and 3a) at the lower ends of ducts 7a, and from thence through the inclined duct portions 7c into the intake of blower 9, as hereinbefore stated.

The air from the blower 9 is passed outwardly into the supply ducts 12 (Fig. 1) which extend along the bottom of the car below the cargo racks 34 (Figs. 3a and 10) from whence the air is redelivered into the cargo space. As shown, the ducts 12 are provided with outlet ports 12x (Fig. 3a) at their outer faces, so as to direct the cooled air toward the sides of the car rather than towards the center of the car.

Figure 11:
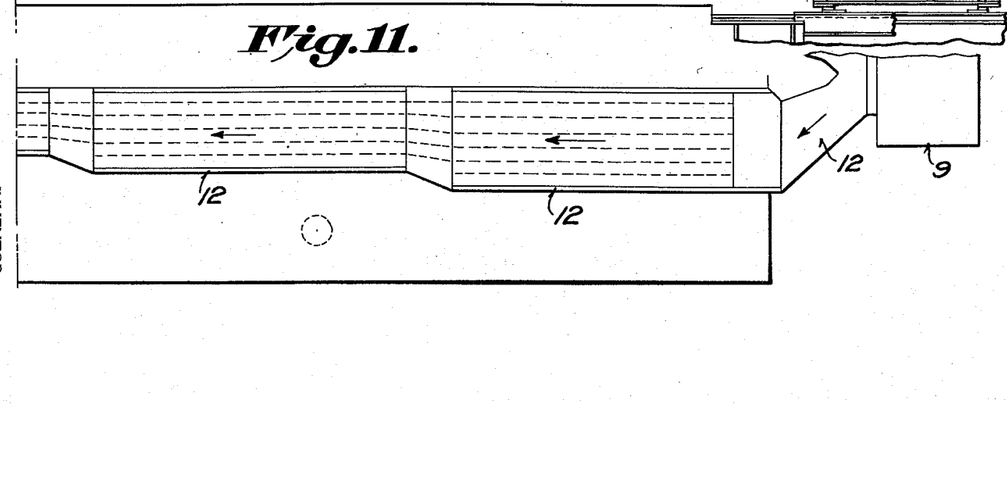
Fig. 11 is a plan view showing the ducts and blower arrangement at one side of a railway car.

The ducts 12 are preferably arranged in progressively decreasing sections and except for openings 12x are otherwise solid, the sections, as shown in Fig. 11, adjacent the blower 9 being of greatest area, and the sections decreasing progressively toward the end of the car furthest removed from chamber C, so as to maintain a relatively balanced flow of cool air through their length, to maintain a substantially constant temperature throughout the length of the cargo space of the car.

Figure 13:
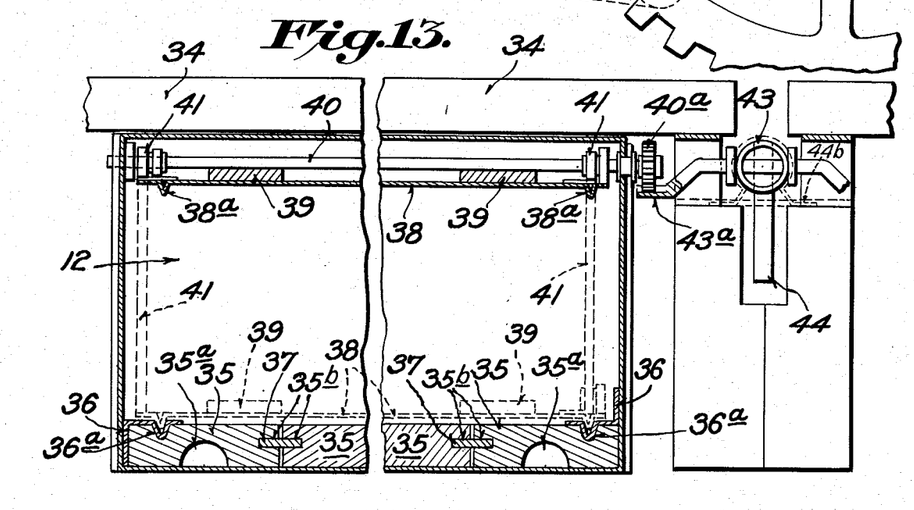
Fig. 13 is an enlarged transverse section through the lower ducts showing the arrangement of humidity barriers in the ducts on the line 13—13, Fig. 14; also the heating elements and the moisture-containing elements, and part of the operating arrangement of the barriers.

A typical cross-section through the ducts 12 is shown in Fig. 13, it being noted that the bottoms thereof are filled with longitudinal rows of porous material or blocks 35 extending in width entirely across the ducts 12, the blocks 35 having substantially semi-circular recesses 35a or channels in their lower faces, into which a supply of liquid, preferably water and/or anti-freeze, is introduced from a sump tank (not shown), thereby maintaining the blocks 35 saturated with moisture at all times. The upper portions of the outermost blocks 35 at their outer portions are covered by cap strips 36 preferably formed of metal, having their horizontal flanges overlying the tops of the adjacent blocks 35, blocks 35 being provided with longitudinal grooves 36a fitting within similar grooves in the top surfaces of the outermost blocks 35, the strips 36 being provided for the purpose hereinafter described.

Means for heating the blocks 35 and thereby to heat the cargo space are provided, the same consisting of electric heating elements 37 of strip form, which are disposed in opposed grooves 35b in the adjacent faces of adjacent blocks 35, the blocks thereby forming a convenient supporting means for the heating elements 37 for heating and aiding humidification of the air without necessitating extraneous supporting means. The heating elements 37 are electrically excited from the generator 2 by any convenient electrical connections, suitable switch means being provided, as hereinafter explained.

Within each of the sections of the supply ducts 12 are humidity barriers 38, shown more particularly in Fig. 13, the same being in the form of plates which may be stiffened by means of longitudinal or cross members 39 (Fig. 13), the barriers 38 extending substantially entirely across the length and width of the duct sections, one being provided for each duct section.

Figure 14:
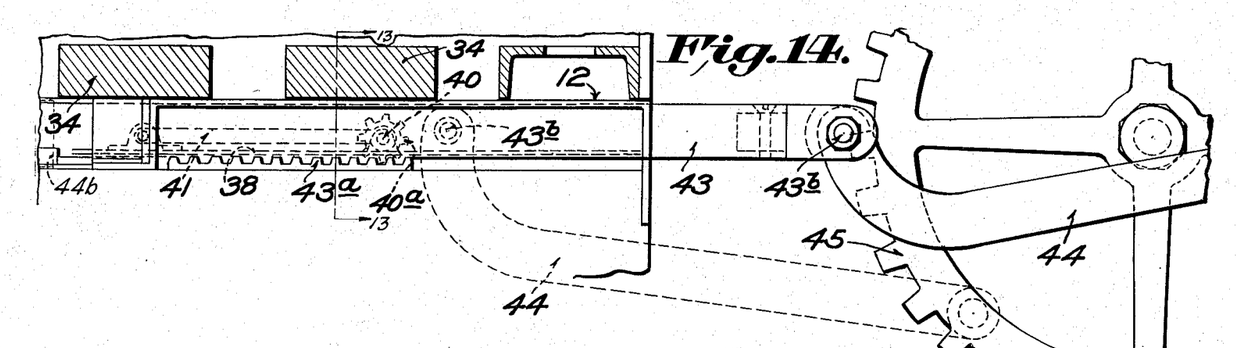
Fig. 14 is an enlarged elevation, partly broken away and partly in section, showing the means for raising and lowering the humidity barriers with respect to the lower ducts.
Figure 17:
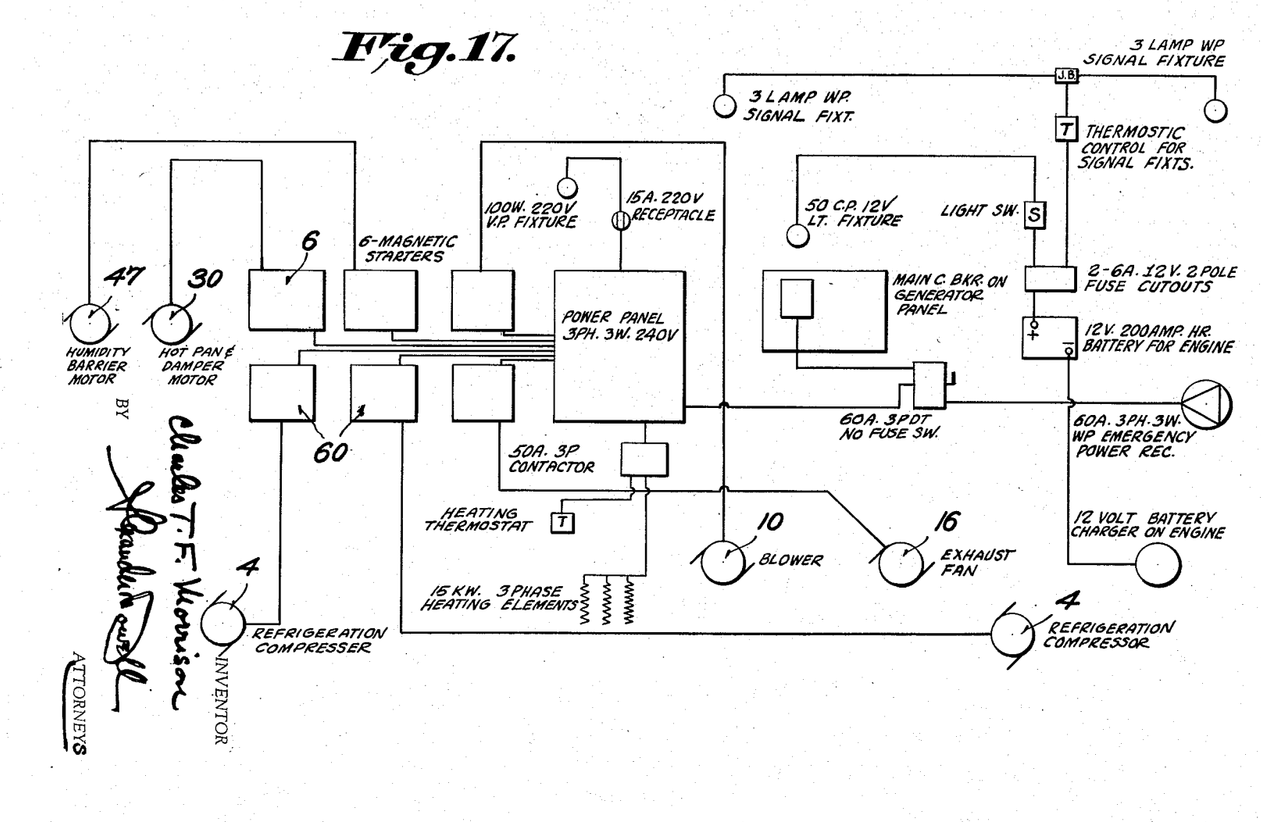
Fig. 17 is a wiring diagram of the entire system.

As shown in Figs. 13 and 14, each barrier 38 is supported on horizontal cross shafts 40 which are journaled in the sides of the duct sections 12, and shafts 40 having arms 41 keyed thereon, the lower end of which arms are pivoted to one of the four corners respectively of its related barrier 38, the arms being of such length that when the arms 41 are raised as shown in dotted lines in Fig. 14 the barriers 38 will be held raised against the top S of the duct sections 12, but when the arms 41 are lowered the barriers 38 will be lowered as shown in dotted lines in Fig. 13 to seat upon the tops of the blocks 35 at the bottoms of the duct sections 12 with their longitudinal lips 38a resting in the grooves 36a of the block plates 36, thereby preventing moisture from passing around the sides of the barriers 38 and up into the bodies of the duct sections 12 above the lowered barriers 38. In this manner the amount of moisture in the air discharged into the car cargo space through the supply ducts 12 can be very nicely regulated, as at the same time the barriers 38 are lowered the moisture will be sealed off from the cargo space completely.

Means are provided for simultaneously actuating the barriers 38, as shown more particularly in Figs. 3a, 13 and 14. An axially slidable rack bar 43 (Figs. 3a, 13 and 14) is provided intermediate the two parallel air supply ducts 12, the same being supported in guides 44b (Figs. 13, 14 and 3a) and extending substantially the full length of ducts 12. The inner end of the bar 43 is pivotally connected, as at 43b, with a link 44, the outer end of link 44 being pivotally connected as at 44a (Fig. 3a) to a gear wheel 45 whereby, as the gear wheel 45 is rotated, bar 43 will by eccentric action be reciprocated back and forth between the air supply ducts 12. Gear wheel 45 is driven by a pinion 46 (Fig. 3a) on the shaft 47a of a motor 47 which is electrically connected in the electric circuit including the generator 2, the control for motor 47 being automatically governed by humidistats or thermostats, in the manner hereinafter set forth. As shown in Figs. 13 and 14, the corners of each barrier 38 are supported by links 41 mounted on shafts 40 (Figs. 13 and 14). Shafts 40 carry pinions 40a (Figs. 13 and 14) which constantly mesh in the racks 43a carried by bar 43 so that as the bar 43 is reciprocated by gear wheel 45 the shafts 40 will be rotated, and the links 41 will be raised and lowered to raise or lower the barriers 38.

Figures 12, 15, 16:
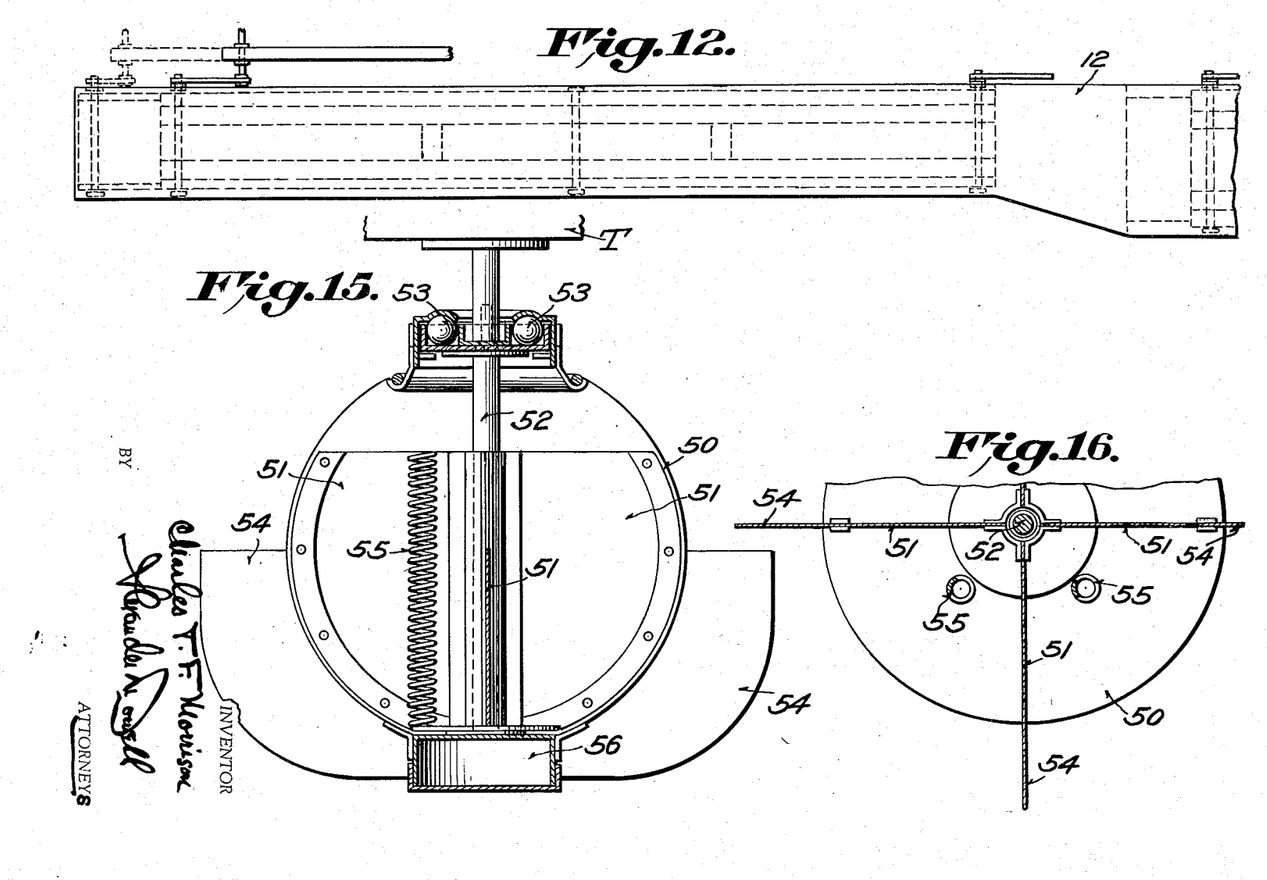
Fig. 12 is a plan view similar to Fig. 11, but showing the arrangement of heating coils and barriers in the lower ducts throughout the cargo space.
Fig. 15 is an elevational view showing the container for absorbing or adsorbing carbon dioxide.
Fig. 16 is a plan elevation, partly in section, of the dessicant container used in my system.

As shown in Figs. 15 and 16, I provide a novel absorbent or adsorbent container 50, for the purpose of eliminating excess quantities of carbon dioxide from the cargo space which is given off by certain types of cargo, the container or containers being attached to the ceiling T of the inside of the cargo space. As shown, each container is of spherical shape and formed of suitable material, the interior thereof, as shown, being divided into four compartments by division plates 51. However, if desired, the number of compartments may be changed to 2, 6 or 8 or any other desired number, provided each of the compartments are equal in size. Each container 50 is carried by a shaft 52 depending from ceiling T, and is supported by anti-friction bearings 53, the upper run of which is carried by the sphere, and the lower run mounted upon the shaft 52, whereby the container 50 may turn freely on its shaft 52.

The lower portion of each spherical container 50 is provided with fins 54 which are attached to the sphere and are motivated by the air flowing into the intake openings 23 of ducts 7 so that the containers 50 can turn slowly, and constantly present a new surface to the air flow. The compartments within the sphere contain sodium hydroxide, activated charcoal, or other desired chemical constituents, and each compartment is provided with a Nichrome electric coil 55 permanently secured with the same, as shown in Figs. 15 and 16.

The electric leads from coils 55 of all the compartments within the container 50 join at one fitting within a housing 56, so that the entire container may be supplied with electric current and reactivated. Should one or more of the compartments fail completely to act in the manner above described, it is possible to replace the components individually. Due to the various number of compartments, it is possible to correctly balance the chemical ingredients as desired. In practice it is found that six containers will handle the most severe carbon dioxide conditions normally encountered within the cargo area space.

When it is necessary to increase the relative humidity rapidly, the air supply ducts 12 may be provided with fine spray jets (not shown) which can be used to rapidly condition the car before the cargo space is loaded.

By the above construction I have provided a system utilizing dual intake and air supply ducts in a cargo space, the ducts being interconnected at their ends within the chamber which houses the diesel-electric power drive, and each duct is provided with a coil inside the said chamber and thus separated or removed from the cargo space so that while defrosting either unit of the refrigerating system, the temperature or humidity or atmospheric conditions within the cargo space remains substantially unchanged, one unit being defrosted while the other is in operation, although normally both units would be operating simultaneously. The arrangement shown in the drawings utilizes only a minimum of space at one end of the cargo space, as only the volume of the intake and air supply ducts 7 and 12 are deducted from the actual cargo space.

In the power chamber C all the heating elements are separated from all the cooling elements by insulation within the chamber C into which air from the outside of the car is constantly drawn through the louvers 17 and dissipated through the outlet 14, and thus any heat within chamber C will have a minimum effect upon the temperature and humidity within the actual cargo space, thus increasing efficiency.

The arrangement of the condenser coils 5 within chamber C is an extremely important feature, since my entire refrigeration system is predicated upon the action of the condensers.

Another novel feature of my system resides in the fact that the refrigerating coils, being disposed in the chamber C, are eliminated from the cargo space itself, and thus can be defrosted without affecting the temperature or humidity of the cargo space.

Either or both of the refrigerating coils 8 may be defrosted without the air of the coil not being defrosted, coming into actual contact with the warm air of the coil being defrosted.

I do not limit my invention to the exact details shown in the drawings, for obviously changes may be made therein within the scope of the claims.

I claim:

1. In a circulating air refrigeration system for vehicles having a cargo space separated by a bulkhead from a non-communicating chamber; spaced air return ducts extending adjacent the top of the cargo space through the bulkhead and having series of air inlet ports therein; spaced air supply ducts extending adjacent the bottom of the cargo space through the bulkhead and having series of air outlet ports therein; the return ducts within the chamber being directed downwardly and converging into a common duct; a blower in said chamber having an air inlet communicating with the common duct and having an outlet communicating with the supply ducts within the chamber; refrigerator coils disposed in the downwardly directed portions of the return ducts respectively; pairs of dampers in the return ducts disposed above and below the coils respectively; means for simultaneously opening and closing the dampers of each return duct; a diesel-generator power unit in said chamber supplying electric current to an electric circuit including a motor and means controlling the cycle of operation of the pair of dampers whereby defrosting of the coils may be automatically effected; refrigerating units in the chamber for the respective coils activated by said electric circuit; and a blower motor in the chamber connected in said electric circuit.

2. In a system as set forth in claim 1, said chamber having air intake louvres in its sides and an air outlet opening in its end; and a fan directing air from the chamber outwardly through the opening; said fan being driven by a motor connected in the electric circuit and maintaining circulation of cooling air through said chamber.

3. In a system as set forth in claim 1, porous material covering the bottoms of the air supply ducts; means for supplying humidifying liquid to said material to saturate the same; barrier plates in said ducts adapted to be raised above and lowered upon the porous material; and means for raising and lowering the said barrier plates to control the humidity of the air supplied to the cargo space.

4. In a system as set forth in claim 1, porous material covering the bottoms of the air supply ducts; means for supplying humidifying liquid to said material to saturate the same; barrier plates in said ducts to control the humidity of the air supplied to the cargo space; pairs of parallel shafts journaled in the ducts and having arms thereon pivotally connected to the respective corners of the related barrier plates; pinions on said shafts; a reciprocable rack bar disposed parallel with the longitudinal axis of said supply ducts and meshing with the said pinions; said means connected in said electrical circuit for reciprocating said rack bar.

5. In a system as set forth in claim 1, porous material covering the bottoms of the air supply ducts, said material having registering recesses in their lower faces; means for supplying humidifying liquid to said material to saturate same; barrier plates in said ducts to control the humidity of the air supplied to the cargo space; pairs of parallel shafts journaled in the ducts and having arms thereon pivotally connected to the respective corners of the related barrier plates; pinions on said shafts; means connected in said electrical circuit for rotating the shafts to raise and lower the plates; said porous material having longitudinally extending grooves in its top adjacent the sides of the ducts; and said barrier plates having correspondingly shaped lips adapted to seat in said grooves to prevent moisture from passing beyond the sides of the barriers when the plates are lowered upon the porous material.

6. In a system as set forth in claim 1, longitudinal rows of porous material extending the length and width of the bottoms of the air supply ducts, said material having registering recesses in their lower faces; means for supplying humidifying liquid into said recesses to maintain the material saturated; barrier plates in said ducts adapted to be raised to the tops of the sections and lowered upon the porous material at the bottoms of the sections; means for raising and lowering the said barrier plates to control the humidity of the air supplied to the cargo space through said supply ducts, the adjacent longitudinal faces of said porous material being provided with opposed longitudinal grooves; and electrical heating elements housed in said grooves and extending the full length of the supply ducts; said heating elements being activated by said electrical circuit.

7. In combination with a system as set forth in claim 1, means in the cargo space adjacent the inlets of the air return ducts for eliminating excess quantities of carbon dioxide from the air in the cargo space.

8. In a circulating air refrigeration system for vehicles having an elongated cargo space separated by a bulkhead thereacross from a non-communicating chamber; a pair of spaced longitudinal air return ducts extending adjacent the top of the cargo space through the bulkhead and having series of air inlet ports in their inner opposed faces; a pair of spaced longitudinal air supply ducts extending adjacent the bottom of the cargo space through the bulkhead and having series of air outlet ports in their outer opposed faces; the return ducts within the chamber being directed downwardly and converging into a common duct; a blower in said chamber having an air inlet communicating with the common duct and having an outlet communicating with the ends of the supply ducts within the chamber; refrigerator coils disposed in the downwardly directed portions of the return ducts respectively; pairs of dampers in the downwardly directed portions of the return ducts disposed above and below the coils respectively; means for simultaneously opening and closing the dampers of each return duct; a diesel-generator power unit in said chamber supplying electric current to an electric circuit including a motor and means automatically controlling the cycle of operation of the pairs of dampers whereby defrosting of the coils may be alternately actuated; refrigerating units in the chamber for the respective coils activated by said electric circuit; and a blower motor in the chamber for rotating the blower connected in said electric circuit.

9. In a system as set forth in claim 8, said chamber having air intake louvres in its sides and an air outlet opening in its end; and a fan directing air from the chamber outwardly through the opening; said fan being driven by a motor connected in the electric circuit and maintaining circulation of cooling air through said chamber.

10. In a system as set forth in claim 8, said air supply ducts being formed in sections progressively decreasing in cross-sectional area from the bulkhead towards the opposite ends thereof; longitudinal rows of porous material covering the bottoms of the ducts and having registering recesses in their lower faces; means for supplying humidifying liquid into said recesses to maintain the material saturated; barrier plates in said sections adapted to be raised against the tops of the sections and lowered upon the porous material; and means operated by the electric circuit for raising and lowering the said barrier plates to control the humidity of the air supplied to the cargo space through said supply ducts.

11. In a system as set forth in claim 8, said air supply ducts being formed in sections progressively decreasing in cross-sectional area from the bulkhead towards the opposite ends thereof; longitudinal rows of porous material covering the bottoms of the ducts and having registering recesses in their lower faces; means for supplying humidifying liquid into said recesses to maintain the material saturated; barrier plates in said sections adapted to be raised against the tops of the sections and lowered upon the porous material; a pair of parallel shafts journaled in each section, said shafts having arms thereon pivotally connected to the respective corners of the related barrier plates; pinions on said shaft; a reciprocable rack bar disposed parallel with the longitudinal axis of said supply ducts and meshing with the said pinions; a wheel in said chamber; a link having one end eccentrically pivoted to said wheel and its other end pivotally connected with said rack bar; a motor in said chamber connected in said electrical circuit for driving said wheel; and thermostats governing the action of said motor.

12. In a system as set forth in claim 8, said air supply ducts being formed in sections progressively decreasing in cross-sectional area from the bulkhead towards the opposite ends thereof; longitudinal rows of porous material covering the bottoms of the ducts, said material having registering recesses in their lower faces; means for supplying humidifying liquid into said recesses to maintain the material saturated; barrier plates in said sections adapted to be raised against the tops of the sections and lowered upon the porous material; a pair of parallel shafts journaled in each section, said shafts having arms thereon pivotally connected to the respective corners of the related barrier plates; pinions on said shafts; a rack bar disposed parallel with the longitudinal axis of said supply ducts and meshing with the said pinions; a wheel in said chamber, a link having one end eccentrically pivoted to said wheel and its other end pivotally connected with said rack bar; a motor in said chamber connected in said electrical circuit for driving said wheel; and thermostats governing the action of said motor; said porous material having longitudinally extending grooves in its top adjacent the sides of the sections; and said barrier plates having correspondingly shaped lips adapted to seat in said grooves to prevent moisture from passing beyond the sides of the barriers when the plates are lowered.

13. In a system as set forth in claim 8, said air supply ducts being formed in sections progressively decreasing in cross-sectional area from the bulkhead towards the opposite ends thereof; longitudinal rows of porous material covering the bottoms of the ducts, said material having registering recesses in their lower faces; means for supplying humidifying liquid into said recesses to maintain the material saturated; barrier plates in said sections adapted to be raised to the tops of the sections and lowered upon the porous material; means for raising and lowering the said barrier plates to control the humidity of the air supplied to the cargo space through said supply ducts; the adjacent longitudinal faces of said porous material being provided with opposed longitudinal grooves; and electrical heating elements housed in said grooves and extending the full length of the supply ducts; said heating elements being activated by said electrical circuit.

14. In combination with a system as set forth in claim 8, means in the cargo space adjacent the inlets of the air return ducts for eliminating excess quantities of carbon dioxide from the air in the cargo space.

15. In a circulating air refrigeration system for vehicles having a cargo space separated by a bulkhead from a non-communicating chamber; a pair of spaced longitudinal air return ducts extending adjacent the top of the cargo space through the bulkhead and having series of air inlet ports in their inner opposed faces; a pair of spaced longitudinal air supply ducts extending adjacent the bottom of the cargo space through the bulkhead and having series of air outlet ports in their outer opposed faces; said air supply ducts being formed in sections progressively decreasing in cross-sectional area from the bulkhead towards the opposite ends thereof to maintain a relatively balanced flow of cool air supplied throughout the length of the cargo space; the return ducts within the chamber being directed downwardly and converging into a common duct; a blower in said chamber having an air inlet communicating with the common duct and having an outlet communicating with the ends of the supply ducts within the chamber; refrigerator coils disposed in the downwardly directed portions of the return ducts respectively; pairs of dampers in the downwardly directed portions of the return ducts disposed above and below the coils respectively; means for simultaneously opening the dampers of each return duct; a diesel-generator power unit in said chamber supplying electric current to an electric circuit including a motor and means automatically controlling the cycle of operation of the pairs of dampers whereby defrosting of the coils may be alternately actuated; refrigerating units in the chamber for the respective coils activated by said electric circuit; and a blower motor in the chamber connected in said electric circuit.

16. In a system as set forth in claim 15, said chamber having air intake louvres in its sides and an air outlet opening in its end; and a fan directing air from the chamber outwardly through the opening; said fan being driven by a motor connected in the electric circuit and maintaining circulation of cooling air through said chamber.

17. In a system as set forth in claim 15, longitudinal rows of porous material extending the entire length and width of the bottoms of the ducts, said material having registering recesses in their lower faces; means for supplying humidifying liquid into said recesses to maintain the material saturated; barrier plates in said sections of substantially the same areas as said sections adapted to be raised to the tops of the sections and lowered upon the porous material at the bottoms of the sections; and means operated by the electrical circuit for raising and lowering the said barrier plates to control the humidity of the air supplied to the cargo space through said supply ducts.

18. In a system as set forth in claim 15, longitudinal rows of porous material extending the entire length and width of the bottoms of the ducts, said material having registering recesses in their lower faces; means for supplying humidifying liquid into said recesses to maintain the material saturated; barrier plates in said sections of substantially the same areas as said sections adapted to be raised to the tops of the sections and lowered upon the porous material at the bottoms of the sections; pairs of parallel shafts journaled in each section, said shafts having arms thereon pivotally connected to the respective corners of the related barrier plates; pinions on said shafts; a rack bar disposed parallel with the longitudinal axis of said supply ducts and meshing with the said pinions; a wheel in said chamber; a link having one end eccentrically mounted on said wheel and its other end pivotally connected with said rack bar; a motor in said chamber connected in said electrical circuit for driving said wheel; and thermostats governing the action of said motor.

19. In a system as set forth in claim 15, longitudinal rows of porous material extending the entire length and width of the bottoms of the ducts, said material having registering recesses in their lower faces; means for supplying humidifying liquid into said recesses to maintain the material saturated; barrier plates in said sections of substantially the same areas as said sections adapted to be raised to the tops of the sections, or lowered upon the porous material at the bottoms of the sections; pairs of parallel shafts journaled in each section, said shafts having arms thereon pivotally connected to the respective corners of the related barrier plates; pinions on said shafts; a rack bar disposed parallel with the longitudinal axis of said supply ducts and meshing with the said pinions; a wheel in said chamber, a link having one end eccentrically mounted on said wheel and its other end pivotally connected with said rack bar; a motor in said chamber connected in said electrical circuit for driving said wheel; thermostats governing the action of said motor; said porous material having longitudinally extending grooves in its top adjacent the sides of the sections; and said barrier plates having correspondingly shaped lips adapted to seat in said grooves to prevent moisture from passing beyond the sides of the barriers when the plates are lowered.

20. In a system as set forth in claim 15, longitudinal rows of porous material extending the entire length and width of the bottoms of the ducts, said material having registering recesses in their lower faces; means for supplying humidifying liquid into said recesses to maintain the material saturated; barrier plates in said sections of substantially the same areas as said sections adapted to be raised to the tops of the sections and lowered upon the porous material at the bottoms of the sections; and means for raising and lowering the said barrier plates to control the humidity of the air supplied to the cargo space through said supply ducts, the adjacent longitudinal faces of said porous material being provided with opposed longitudinal grooves; and electrical heating elements housed in said grooves and extending the full length of the supply ducts; said heating elements being activated by said electrical circuit.

References Cited in the file of this patent

UNITED STATES PATENTS

| | | |
|---|---|---|
| 2,116,538 | Mussey et al. | May 10, 1938 |
| 2,164,579 | Ecoff | July 4, 1939 |
| 2,193,835 | Murphy et al. | Mar. 19, 1940 |
| 2,496,751 | Ritter | Feb. 7, 1950 |